United States Patent
Borrelli et al.

(10) Patent No.: US 8,302,428 B2
(45) Date of Patent: Nov. 6, 2012

(54) EXTRUDED GLASS STRUCTURES AND METHODS FOR MANUFACTURING THE SAME

(75) Inventors: Nicholas Francis Borrelli, Elmira, NY (US); David John McEnroe, Corning, NY (US); Elizabeth Marie Vileno, Corning, NY (US)

(73) Assignee: Corning Incorporated, Corning, NY (US)

( * ) Notice: Subject to any disclaimer, the term of this patent is extended or adjusted under 35 U.S.C. 154(b) by 350 days.

(21) Appl. No.: 12/528,732

(22) PCT Filed: Feb. 20, 2008

(86) PCT No.: PCT/US2008/002244
§ 371 (c)(1), (2), (4) Date: Aug. 26, 2009

(87) PCT Pub. No.: WO2008/106038
PCT Pub. Date: Sep. 4, 2008

(65) Prior Publication Data
US 2010/0105537 A1 Apr. 29, 2010

Related U.S. Application Data
(60) Provisional application No. 60/903,903, filed on Feb. 28, 2007.

(51) Int. Cl.
C03C 17/00 (2006.01)
C03C 21/00 (2006.01)
C03C 23/00 (2006.01)
C03C 25/00 (2006.01)
C03C 3/06 (2006.01)

(52) U.S. Cl. ................... 65/31; 65/30.1; 501/54

(58) Field of Classification Search ............ 501/53, 501/54; 65/30.1, 31
See application file for complete search history.

(56) References Cited

U.S. PATENT DOCUMENTS

| | | | | |
|---|---|---|---|---|
| 3,357,808 A | * | 12/1967 | Eberle | 65/467 |
| 3,938,974 A | * | 2/1976 | Macedo et al. | 65/399 |
| 4,249,924 A | * | 2/1981 | de Panafieu et al. | 65/427 |
| 4,521,236 A | | 6/1985 | Yamamoto et al. | 65/31 |
| 4,892,712 A | | 1/1990 | Robertson et al. | 422/186 |
| 4,966,759 A | | 10/1990 | Robertson et al. | 422/186 |
| 5,032,241 A | | 7/1991 | Robertson et al. | 204/157.15 |
| 5,250,095 A | * | 10/1993 | Sigel et al. | 65/378 |
| 5,449,443 A | | 9/1995 | Jacoby et al. | 204/157.3 |

(Continued)

FOREIGN PATENT DOCUMENTS
GB 824972 12/1959
(Continued)

OTHER PUBLICATIONS

Birks et al. Endlessly single-mode photonic crystal fiber. Optics Letters, Jul. 1, 1997. vol. 22, No. 13, pp. 961-963.*

(Continued)

*Primary Examiner* — Noah Wiese
(74) *Attorney, Agent, or Firm* — Joseph M. Homa

(57) ABSTRACT

Methods for preparing glass structures include extruding a glass precursor, the glass precursor having a composition in the range of 55%-75% $SiO_2$, 5%-10% $Na_2O$, 20%-35% $B_2O_3$ and 0%-5% $Al_2O_3$, and heat treating and leaching the glass precursor to yield a glass article comprising at least about 90% $SiO_2$ by weight. Glass articles can be used to manufacture a variety of geometrically complex structures.

12 Claims, 2 Drawing Sheets

U.S. PATENT DOCUMENTS

| | | | |
|---|---|---|---|
| 5,779,912 A | 7/1998 | Gonzalez-Martin et al. | 210/748 |
| 5,861,132 A | 1/1999 | Pratsinis et al. | 423/613 |
| 6,136,186 A | 10/2000 | Gonzalez-Martin et al. | 210/198.1 |
| 6,214,195 B1 | 4/2001 | Yadav et al. | 205/334 |
| 6,221,259 B1 | 4/2001 | Kittrell | 210/748 |
| 6,247,987 B1 | 6/2001 | Moore | 445/24 |
| 6,267,864 B1 | 7/2001 | Yadav et al. | 205/341 |
| 6,285,816 B1 | 9/2001 | Anderson et al. | 385/141 |
| 6,309,611 B1 | 10/2001 | Tabatabaie-Raissi et al. | 422/186.3 |
| 6,315,870 B1 | 11/2001 | Tabatabaie-Raissi et al. | 204/157.3 |
| 6,342,128 B1 | 1/2002 | Tabatabaie-Raissi et al. | 204/157.15 |
| 6,354,899 B1 | 3/2002 | Moore | 445/25 |
| 6,409,928 B1 | 6/2002 | Gonzalez et al. | 210/748 |
| 6,414,433 B1 | 7/2002 | Moore | 313/582 |
| 6,431,935 B1 | 8/2002 | Moore | 445/24 |
| 6,452,332 B1 | 9/2002 | Moore | 313/582 |
| 6,468,374 B1 | 10/2002 | Kar et al. | 156/89.22 |
| 6,479,129 B1 | 11/2002 | Kar et al. | 428/116 |
| 6,524,447 B1 | 2/2003 | Carmignani et al. | 204/158.2 |
| 6,524,536 B2 | 2/2003 | Newman et al. | 422/122 |
| 6,531,035 B2 | 3/2003 | Tabatabaie-Raissi et al. | 204/157.15 |
| 6,548,142 B1 | 4/2003 | Kar et al. | 428/116 |
| 6,570,339 B1 | 5/2003 | Moore | 315/169.3 |
| 6,582,666 B2 | 6/2003 | Tabatabaie-Raissi et al. | 422/186 |
| 6,750,605 B2 | 6/2004 | Moore | 313/495 |
| 6,752,957 B1 | 6/2004 | De Lasa et al. | 422/22 |
| 6,783,740 B2 | 8/2004 | Colby et al. | 422/186.3 |
| 2001/0033483 A1 | 10/2001 | Moore | 326/84 |
| 2001/0050218 A1 | 12/2001 | Tabatabaie-Raissi et al. | 204/157.14 |
| 2001/0054870 A1 | 12/2001 | Moore | 313/584 |
| 2002/0035162 A1 | 3/2002 | Newman et al. | 6/98 |
| 2002/0050450 A1 | 5/2002 | Newman et al. | 204/157.3 |
| 2002/0102674 A1 | 8/2002 | Anderson | 435/174 |
| 2002/0109269 A1 | 8/2002 | Miura et al. | 264/432 |
| 2003/0150707 A1 | 8/2003 | Carmignani et al. | 204/157.3 |
| 2003/0167878 A1 | 9/2003 | Al-Salim et al. | 75/711 |
| 2004/0031435 A1 | 2/2004 | Park | 117/2 |
| 2004/0075387 A1 | 4/2004 | Moore | 313/582 |
| 2004/0092393 A1 | 5/2004 | Bygott et al. | 502/350 |
| 2006/0201200 A1 * | 9/2006 | Akai et al. | 65/30.1 |

FOREIGN PATENT DOCUMENTS

| | | |
|---|---|---|
| GB | 1 557 074 | 12/1979 |
| GB | 1557074 A * | 12/1979 |
| WO | 00/13768 | 3/2000 |
| WO | 00/65629 | 11/2000 |
| WO | 03/054903 | 7/2003 |

OTHER PUBLICATIONS

Anpo, S.; JP10 043601, Ion Kogaku Kenkyusho KK1, Feb. 17, 1998, Abstract.

Russell, P., "Photonic Crystal Fibres", Science vol. 299, Jan. 17, 2003, pp. 358-362.

* cited by examiner

EXTRUDED GLASS STRUCTURES AND METHODS FOR MANUFACTURING THE SAME

CROSS-REFERENCE TO RELATED APPLICATIONS

This application claims the benefit of U.S. Provisional Patent Application No. 60/903,903 filed on Feb. 28, 2007 entitled "EXTRUDED GLASS STRUCTURES AND METHODS FOR MANUFACTURING THE SAME," the content of which is relied upon and incorporated herein by reference in its entirety.

BACKGROUND

1. Field of the Invention

This invention relates to extrusion of low temperature glass precursors and subsequent formation of high temperature, geometrically complex glass structures from the extruded glass precursor.

2. Technical Background

While common structures made of glass have become inseparable from our daily lives, the unique properties of glass also allow its use in complex structures for high-technology specialty applications. Photonic crystal fibers, photocatalytic substrates and filtration devices made of glass, for example, belong in the latter category. Such structures are generally geometrically complex, and therefore, are difficult to manufacture. Aside from being geometrically complex, it is desired that these structures possess certain characteristics, such as high UV transparency, high softening temperatures and low thermal expansion, for commercial applications.

Conventional processes for manufacturing such structures include extrusion, among other processes. However, extrusion of conventional glasses to form geometrically complex structures provides many challenges. For example, the softening temperature of conventional glasses used to manufacture complex glass structures (e.g., hard glasses, such as fused silica and fused quartz) can be in the range of around 1550° C.-1700° C. Once softened and melted, extrusion of conventional hard glass would occur at around 1800° C.-2000° C. Accomplishing and extruding glass at these high temperatures is extremely difficult.

As an alternative to high temperature hard glasses, use of low temperature soft glasses in the manufacture of geometrically complex structures is generally known. Such low temperature glasses generally have a softening temperature at around 500° C.-800° C. and are extruded at about 800° C.-1200° C. While low temperature glasses are generally easier to melt and extrude than high temperature glasses, low temperature glasses similarly have issues. Particularly, low temperature glasses often include components other than silica, such as lead, alkali or alkaline earth metals. While incorporation of these other components decreases the softening temperature and allows these glasses to be more effectively extruded, the resulting structures have low UV transparency, low softening temperatures and high thermal expansion, which makes them less desired for commercial applications.

Accordingly, there is a need for glass materials that facilitate effective manufacture of geometrically complex structures, but include the characteristics of high UV transparency, high softening temperatures and low thermal expansion.

SUMMARY

The invention is intended to address and obviate problems and shortcomings and otherwise improve previous extruded glass structures and methods for manufacturing the same.

To achieve the foregoing, one embodiment of the invention includes a glass article made by the process of providing a glass precursor having a composition, expressed in terms of weight percentage on an oxide basis, consisting essentially of 55%-75% $SiO_2$, 5%-10% $Na_2O$, 20%-35% $B_2O_3$ and 0%-5% $Al_2O_3$. The method can also include extruding the glass precursor, causing phase-separation in the glass precursor by a heat treatment, leaching the glass precursor to obtain a porous glass article comprising at least 90% by weight of silica and optionally heating the porous glass article such that the pores collapse to form a densified glass article.

To further achieve the foregoing, one embodiment of the invention includes a method for preparing a glass article comprising providing a glass precursor having a composition, expressed in terms of weight percentage on an oxide basis, consisting essentially of 55%-75% $SiO_2$, 5%-10% $Na_2O$, 20%-35% $B_2O_3$ and 0%-5% $Al_2O_3$. The method can also include extruding the glass precursor, causing phase-separation in the glass precursor by a heat treatment and leaching the glass precursor to obtain a porous glass article comprising at least 90% by weight of silica.

BRIEF DESCRIPTION OF THE DRAWINGS

A complete understanding of the present invention may be obtained by reference to the accompanying drawings, when considered in conjunction with the subsequent detailed description, in which.

Figure 1:
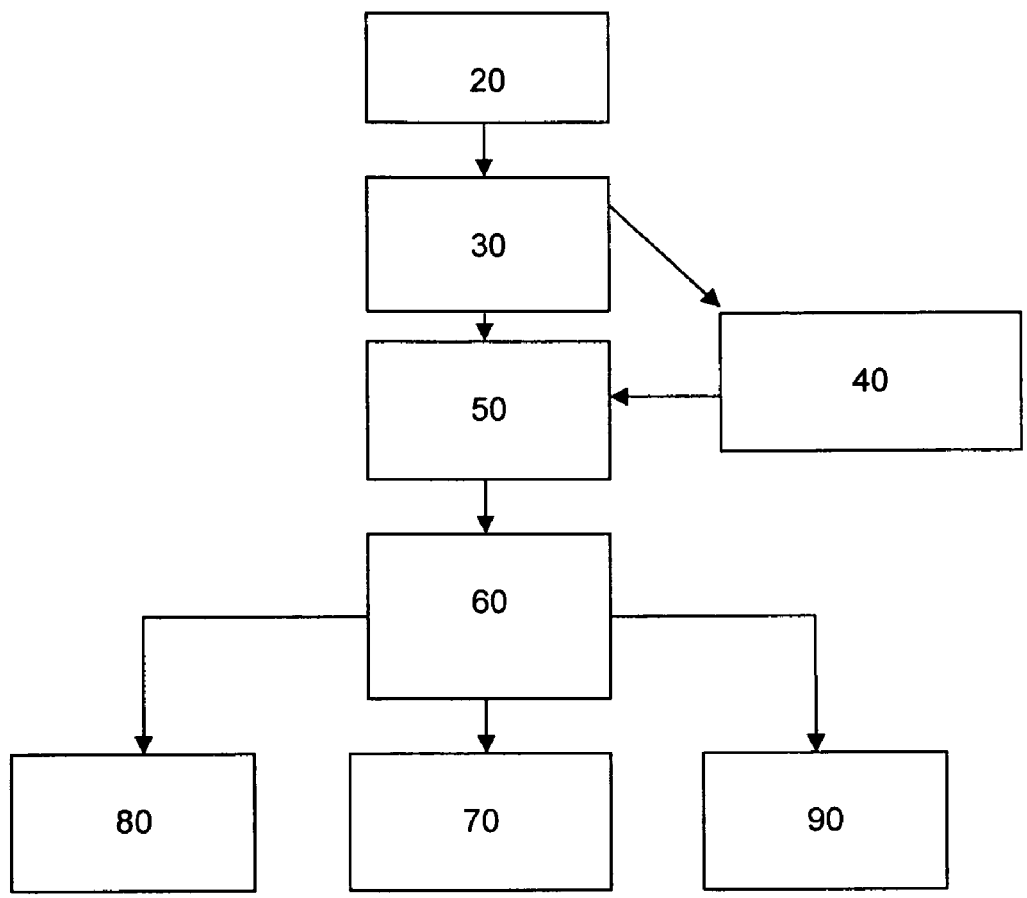
FIG. 1 is a block diagram illustrating an exemplary method of manufacturing a glass structure in accordance with one embodiment of the present invention.

The embodiments set forth in the drawings are illustrative in nature and not intended to be limiting of the invention defined by the claims. Moreover, individual features of the drawings and the invention will be more fully apparent and understood in view of the detailed description.

DETAILED DESCRIPTION

Unless otherwise indicated, all numbers such as those expressing weight percents of ingredients, dimensions, and values for certain physical properties used in the specification and claims are to be understood as being modified in all instances by the term "about." It should also be understood that the precise numerical values used in the specification and claims form additional embodiments of the invention. Efforts have been made to ensure the accuracy of the numerical values disclosed in the Examples. Any measured numerical value, however, can inherently contain certain errors resulting from the standard deviation found in its respective measuring technique.

As used herein, in describing and claiming the present invention, the use of the indefinite article "a" or "an" means "at least one," and should not be limited to "only one" unless explicitly indicated to the contrary. As used herein, a "wt %" or "weight percent" or "percent by weight" of a component, unless specifically stated to the contrary, is based on the total weight of the composition or article in which the component is included. As used herein, all percentages are by weight unless indicated otherwise.

As used herein, a "glass precursor" is the base glass material that will be used for extrusion and/or will undergo an initial heat treatment and leaching. As used herein, a "glass article" is a glass material that has been leached. The "glass article" may be a porous body (e.g., a "thirsty glass") or be a consolidated body (formed through additional processing steps). "Glass articles" formed by methods described herein can be utilized to manufacture a variety of other geometrically complex "glass structures" including photonic crystal fibers, photocatalytic substrates and filtration devices, to name a few. Accordingly, "glass structures" as used herein can include the product resulting from leaching and/or that leached product which has undergone subsequent processing to yield another glass structure (e.g., photonic crystal fibers, photocatalytic substrates and/or filtration devices and systems).

An exemplary process for forming a glass structure in accordance with one embodiment of the invention is illustrated in FIG. 1. As will be described more fully herein, the inventors have discovered that extrusion of a glass precursor with a relatively low softening temperature combined with subsequent treatment to increase the softening temperature, increases UV transparency, decreases thermal expansion of the resulting structure, and thereby allows for a more efficient method of manufacture of geometrically complex structures. Accordingly, in contrast to extrusion of conventional glasses wherein the glass to be extruded had a high softening temperature (and was difficult to extrude) or had a low softening temperature (and had a low UV transparency to light and a high thermal expansion), glass structures formed through glass precursors/materials and methods described herein are both easier to extrude and possessive of characteristics making these structures desired for commercial applications.

In one embodiment, the glass precursor may be one high in silica content. It is believed that the properties typically associated with such glasses are desired in geometrically complex structures. For example, glass precursors high in silica content usually have a softening temperature around 1500° C. or higher, have low thermal expansion and high UV transparency. In one embodiment, the glass precursor/materials may comprise the precursor to the VYCOR® product, manufactured by Corning Inc. of Corning, N.Y. Generally, VYCOR® starts as an alkali borosilicate glass that is put through processing steps to transform the alkali borosilicate glass into a 96% silica structure. This 96% silica structure can be a porous body or a consolidated glass body.

The VYCOR® product and one glass precursor are described in Corning Inc.'s U.S. Pat. No. 2,106,744 (the '744 Patent), which is hereby incorporated by reference in its entirety. As disclosed therein, glass compositions in a certain region of the ternary system—$R_2O$—$B_2O_3$—$SiO_2$—will, on the proper heat treatment, separate into two phases. One of the phases is very rich in silica, whereas the other phase is very rich in alkali and boric oxide. The '744 Patent discloses a precursor composition of 75% $SiO_2$, 5% $Na_2O$, and 20% $B_2O_3$. However, other precursor compositions for use with the methods described herein include, for example, a composition of 60.82% $SiO_2$, 7.5% $Na_2O$, 28.7% $B_2O_3$, 2.83% $Al_2O_3$ and 0.15% Cl, such a composition having a softening point around 670° C. and thermal expansion of around 52.5× 10−7/K. Of course, it should be understood that any other silica glass composition having a composition range (in weight percentage) of around 55-75% $SiO_2$, 5-10% $Na_2O$, 20-35% $B_2O_3$, 0-5% $Al_2O_3$ and 0-0.5% Cl are contemplated for use with the methods of the present invention.

Generally, extrusion of glass materials allows for many design alternatives because the die of the extruder can include any desirable geometric feature required for the ultimate application. For example, the die may be configured to extrude a honeycomb structure or any other structure that will ultimately be formed into photonic crystal optical fibers, photocatalysis substrates, filtration systems and other complex geometric structures. Moreover, glass materials extruded according to the present invention allow greater flexibility in design as a result of the initial workability of the glass precursor/material, and thus, will enable creation of novel geometries through extrusion.

Referring to the exemplary process illustrated in FIG. 1, prior to extrusion, the glass precursor/material is melted 20 at a temperature of around 1500° C. In contrast to the glass precursor described herein, extrusion of a hard glass such as fused silica or fused quartz would be difficult to extrude because it has a high softening/working temperature (greater than 1500° C./1800° C.). Afterwards, the glass is cooled (not shown) at room temperature.

The glass is then reheated to around 700° C.-900° C. so that it can be extruded. The hot glass is then extruded 30 through the extruder to take the shape of the corresponding die. It is pressed through the die 20 using about 200 to 3000 pounds across the 4" diameter boule (16 to 210 psi). The extrusion can be protected from drafts and cold air shock using passive or active processes. In one embodiment, the die may comprise a hexagonal shape, such as that to be incorporated into a photonic crystal optical fiber (discussed later herein). However, it should be appreciated that the die can have any shape corresponding to the ultimate application.

If desired, the extruded glass material may be redrawn 40 to attenuate the glass prior to heat treatment 50. For example, the glass material exiting the extruder 30 may have a diameter of about 3 inches. The glass material may then be redrawn on a 2:1 to 10:1 ratio (or any other desired ratio depending on application) to decrease the diameter of the glass material, while maintaining the geometric integrity. Redrawing is usually conducted at a temperature of around 100° C. warmer than that needed for extrusion.

Still referring to FIG. 1, after extrusion, the extruded glass material is heat treated 50. Heat treatment of the glass material may be conducted at around 580° C.-650° C. with a specific ramp up and cool down rate. The amount of time that the glass material is heat treated can be variable depending on the glass wall thickness, but 3 hours is generally known (e.g., a 1 mm thick sample may be heat treated for 20 minutes at 600° C. to 650° C.). During heat treatment, a phase separation occurs in the glass between the alkali borate group (very rich in alkali and boric oxide) and the silicaoxygen group (very rich in silica).

After heat treatment 50, the glass material may be etched (not shown) to remove the silica rich skin. Etching can be conducted by submerging the heat treated glass into a bath of 10% NH4F×HF solution. The amount of time for etching is dependent on the glass wall thickness and can include anywhere from several hours to days (e.g., a 1 mm thick sample may be etched for 10 minutes at room temperature).

The heat treated glass material then undergoes a leaching step 60. During the leaching step 60, the alkali borate is removed. The leaching step 60 can be conducted in multiple stages using $HNO_3$ (e.g., a 1 mm thick sample may be leached over a 45 hour period and a 6 mm thick sample may be leached for up to 30 days, each at 95° C.). The glass material is then washed and dried. After leaching, a glass article with an interconnected phase separated network of around 1-6 nm size is created.

As a result of the foregoing processes, the softening temperature increases from around 670° C. (glass precursor) to 1500 ° C. (glass article). In addition, the glass structure at this stage is porous (28-30% by volume), with pores ranging in size from about 1 nm to about 12 nm, and an average pore size of about 5 nm-6 nm. If desired, the glass article may be heated such that any pores collapse to form a densified glass article. In addition, the glass structure comprises at least 90% silica by weight and up to about 96% silica by weight (it is around 96% (e.g., 95% or more) silica because 4% residual boron usually remains in the glass structure after leaching 60).

As described herein, despite the reheating of the glass precursor after melting and the high temperatures and pressures required for the extrusion process, phase separation is not adversely affected by such heat processing. This was previously unforeseen because it would be expected that such heat processing would least interfere with phase separation. Hence, the glass precursors described herein are capable of being efficiently extruded (because of their lower softening temperatures), and subsequently phase separated (and leached) to yield a glass structure with a high softening temperature and desired characteristics such as low thermal expansion and high UV transparency. Accordingly, it is believed the glass precursors and glass structures, as well as the methods of using and manufacturing the same as described herein will not only provide more efficient manufacturing of geometrically complex structures, but also provide a method for manufacturing novel complex glass structures previously not obtainable through extrusion of conventional glasses with high or low softening points.

Also, it should be understood that because the heat processing (e.g., processing involved with extrusion) described herein does not interfere with phase separation, many methods of manufacturing glass precursors of the invention can be realized. For example, referring to FIG. 1, rather than extruding 30 and then heat treating 50, in another embodiment, the glass precursor may first be heat treated and subsequently extruded (each step conducted as described above). It is believed that the subsequent extrusion of a heat treated glass precursor described herein will not interfere with phase separation that occurred during heat treatment. Similarly, in yet another embodiment, the glass precursor may be heat treated to commence phase separation during the extrusion process, thereby combining the two steps. Because phase separation appears to be unaffected by the extrusion process, a variety of processes are contemplated and should be understood. Accordingly, references to "extrusion" and "heat treatment" herein should not be limited to sequential or independent process steps.

Figure 2:
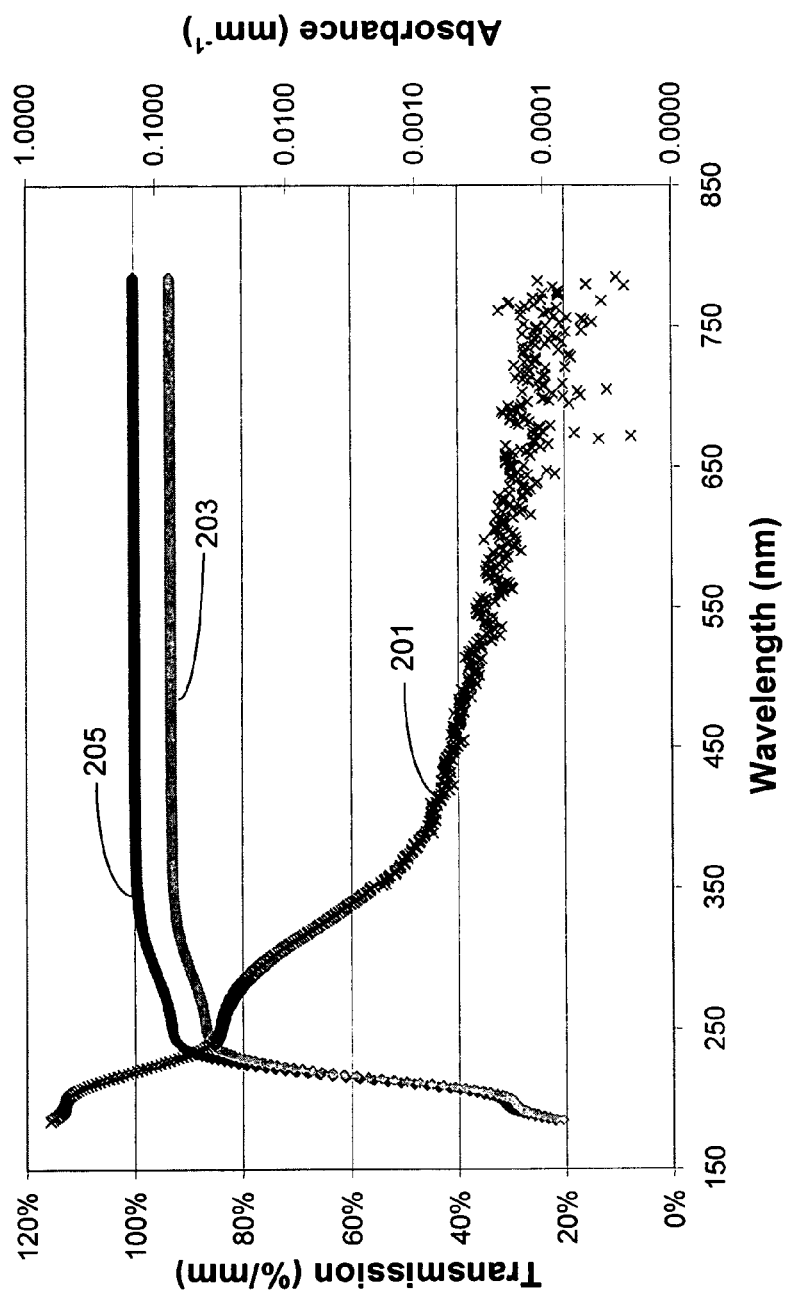
FIG. 2 illustrates the results of a UV-Vis transmission measurement (transmission/wavelength/absorbance) taken of an exemplary glass structure formed in accordance with one embodiment of the present invention.

As stated, the glass structures formed by methods described herein can be porous (e.g., "thirsty glass") or consolidated (through subsequent processing, such as that described below). As illustrated in FIG. 2, the transmittance of UV-Vis light for a consolidated glass structure 3.9 mm thick (normalized to 1 mm) was measured. The glass structure of FIG. 2 was measured for 800 nm-185 nm UV transparency using a Cary 5G UV-Vis-NIR Spectrophotometer using the following instrument parameters: Averaging time: 0.1 sec, Scan rate: 120 nm/min, Spectral band width: 2.0 nm, Beam mode: Double, Slit height: Full, Detector: PMT, Source changeover (Tungsten-Halogen→Deuterium): 350 nm, Baseline corrected using empty sample holder, Sample aperture: 12 mm×19 mm In this figure, 201 is the curve of normalized absorbance (log10) of the sample; 203 is the curve of normalized transmission of the sample; and 205 is the curve of transmission without reflection of the sample.

As illustrated in FIG. 2, a consolidated glass structure made in accordance with the present invention has an 90.29% normalized transmittance at 300 nm. The processing steps discussed herein (heat separation and leaching) results in a glass structure not only having a higher softening temperature and lower thermal expansion, but also having a high UV transparency, as desired in commercial applications.

Referring again to FIG. 1, subsequent processing on the glass structures manufactured through the processes described herein can be used to manufacture many products. For example, because of their high visible and UV (ultra violet) transparency and the porous nature (which allows for the easy incorporation of catalysts), glass structures of the invention may be used as photocatalysis supports/devices (e.g., structures in which the light, gas reactants, and catalysts can all come together into each other in three dimensions). Particularly, to form a photocatalysis support, the glass structure (which may be consolidated or porous) may be coated with an appropriate photocatalytic material such as $TiO_2$, ZnO, CdS among others and lit with a visible and/or UV source to act as a 3D photocatalytic support 70.

Where a consolidated photocatalytic support is desired, the glass structure may be consolidated at 1225° C. for at least 30 minutes after leaching 60 to collapse the porosity into a solid body. In such consolidated photocatalytic support, the visible and UV light can travel unimpeded by the structure through and down the walls to activate the semiconductor catalyst, producing an electron-hole pair, while at the same time that the reactant gases can flow unimpeded by the light source down the channels because of the high transmittance of the glass structures manufactured through processes described herein. In unconsolidated (porous or thirsty) photocatalytic supports, the visible and UV light will be scattered and absorbed by the semiconductor coating. Reactors of this type are suitable for both homogeneous and heterogeneous photocatalysis. Water splitting and decomposition of volatile organic compounds (VOC) have been extensively researched. The structure proposed here would be suitable for these and other reactions.

In another embodiment, glass structures manufactured by processes described herein can be used to make a filter or membrane system 80. In such systems porous glass articles with thin walls are usually desired. Because of the capabilities associated with extrusion of the glasses described herein, thin walled materials could be extruded and further drawn down to desired specifications (e.g., 2:1 to 100:1 ratio) for use with such systems. In addition, the porous glass structure can be impregnated with a variety of constituents which would be maintained in the glass after consolidation. Examples would be quantum dots such as PbS and CdS, magnetic phases, and a variety of transition metal oxides.

In yet another embodiment, the glass structures manufactured by the processes described herein can be consolidated and used to make a fiber preform for a photonic crystal fiber 80 (e.g., photonic-bandgap fibers, holey fibers, hole-assisted fibers and/or Bragg fibers). Conventional methods used to produce pure silica (hard glasses) photonic crystal fibers include stack-and-draw, which uses high purity silica tubes or extrusion of high purity soot with a binder. The high softening temperature of such hard glasses make them difficult to extrude. For softer glasses, the method of hot extrusion has been used to produce a geometrically structured preform, but these soft glasses have many undesired characteristics such as low UV transparency, low softening temperature and high thermal expansion. Extrusion of the glass materials to yield glass structures described herein not only provides a lower temperature forming process, but in addition allows the fabrication of more geometrically complex patterns than conventional forming processes, while providing high quality photonic crystal fibers.

It is a matter of course that the glass materials, glass structures and the methods for manufacturing the same according to the invention are not limited to the embodiments described above. Many alternatives, modifications and variations will be apparent to those skilled in the art of the above teaching. For example, the glass materials in accordance with the invention may comprise a number of precursors useful for manufacturing a number of glass structures. Accordingly, while some of the alternative embodiments have been discussed specifically, other embodiments will be apparent or relatively easily developed by those of ordinary skill in the art.

What is claimed is:

1. A method for preparing a glass article comprising:
providing a glass precursor having a composition, expressed in terms of weight percentage on an oxide basis, consisting essentially of:
55%-75% $SiO_2$;
5%-10% $Na_2O$;
20%-35% $B_2O_3$; and
0%-5% $Al_2O_3$;
melting the glass precursor;
allowing the melted glass precursor to cool;
reheating the cooled glass precursor to a temperature in a range from about 700° C. to about 900° C.;
extruding the glass precursor;
heat treating the glass precursor, thereby causing phase-separation in the glass precursor; and
leaching the glass precursor to obtain a porous glass article comprising at least 90% by weight of silica.

2. The method of claim 1, further comprising heating the porous glass article such that the pores collapse to form a densified glass article.

3. The method of claim 1, wherein the heat treating occurs at least partly simultaneously with the extruding the glass precursor.

4. The method of claim 1, wherein the heat treating occurs at least partly subsequent to the extruding the glass precursor and prior to leaching the glass precursor.

5. The method of claim 2, wherein the densified glass article has a transmission of at least 75%/mm in the range from 230 nm to 350 nm.

6. The method of claim 2, wherein the densified glass article has an absorbance of about 0.065 to about 0.002 $mm^{-1}$ in a wavelength range from 230 nm to 350 nm.

7. The method of claim 1, wherein the glass precursor has a softening temperature in the range from 500° C. to 800° C. and the glass article has a softening temperature in the range from 1300° C. to 1700° C.

8. The method of claim 1, wherein the glass precursor is melted at a temperature of about 1500° C.

9. The method of claim 1, further comprising etching the glass precursor to remove a silica rich skin of the glass precursor.

10. The method of claim 1, wherein the glass precursor is leached with $HNO_3$.

11. The method of claim 1, wherein the glass precursor is heat treated at a temperature in the range from about 580° C. to about 650° C.

12. A method for preparing a glass article comprising:
providing a glass precursor having a composition, expressed in terms of weight percentage on an oxide basis, consisting essentially of:
55%-75% $SiO_2$;
5%-10% $Na_2O$;
20%-35% $B_2O_3$; and
0%-5% $Al_2O_3$;
melting the glass precursor;
allowing the melted glass precursor to cool;
reheating the cooled glass precursor;
extruding the glass precursor;
heat treating the glass precursor at a temperature in a range from about 580° C. to about 650° C., thereby causing phase-separation in the glass precursor;
etching the glass precursor to remove a silica rich skin of the glass precursor; and
leaching the etched glass precursor to obtain a porous glass article comprising at least 90% by weight of silica.

* * * * *